Figure 1:
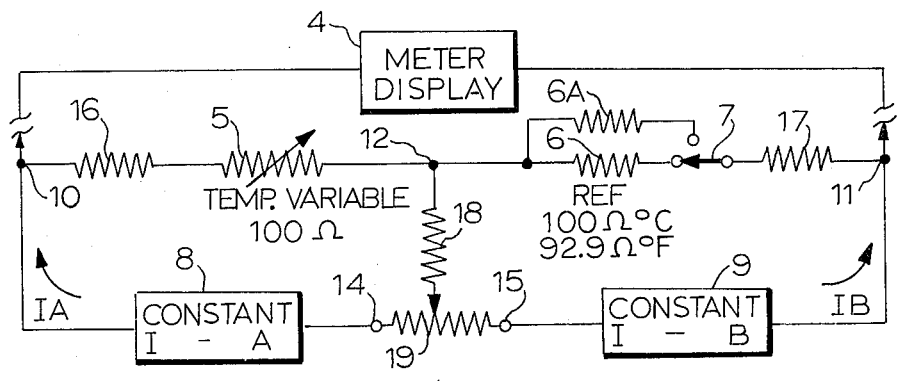

United States Patent [19]
Dumbeck

[11] 3,906,796
[45] Sept. 23, 1975

[54] ELECTRONIC TEMPERATURE MEASURING APPARATUS

[76] Inventor: Robert Francis Dumbeck, 104 Anderson Dr., Elgin, Tex. 78621

[22] Filed: Jan. 14, 1974

[21] Appl. No.: 433,206

[52] U.S. Cl. ............. 73/362 AR; 323/68; 324/65 R
[51] Int. Cl.² .......................................... G01K 7/24
[58] Field of Search ...... 73/342, 362 AR; 324/65 R; 323/75 H, 75 N, 68

[56] References Cited
UNITED STATES PATENTS

| | | | |
|---|---|---|---|
| 3,347,098 | 10/1967 | Bielstein et al. ..................... | 73/342 |
| 3,379,973 | 4/1968 | Walton....................... | 73/362 AR X |
| 3,605,008 | 9/1971 | Shoemaker et al. .............. | 323/75 N |
| 3,688,581 | 9/1972 | LeQuernec..................... | 73/362 AR |
| 3,695,112 | 10/1972 | Possell............................ | 73/362 AR |
| 3,742,764 | 7/1973 | Dauphinee ..................... | 73/362 AR |
| 3,754,442 | 8/1973 | Arnett............................ | 73/362 AR |
| 3,805,616 | 4/1974 | Sugiyama....................... | 73/362 AR |

Primary Examiner—Richard C. Queisser
Assistant Examiner—Frederick Shoon
Attorney, Agent, or Firm—J. Harold Kilcoyne

[57] ABSTRACT

Temperature is measured by sensing the voltage across two series resistors, one a reference resistor and the other a temperature variable resistor such as platinum. Two matched constant current sources pass current in opposite directions toward the junction of the resistors to produce a null at a predetermined temperature such as 0°F or 0°C, for example.

If high accuracy is required, linearization is provided for matching the temperature characteristic of the variable sensor resistor with a linear voltage scale of a digital voltmeter, for example, to permit use of a conventional voltmeter arrangement to read out degrees directly in either Centigrade or Fahrenheit. Also tracking is accomplished over a wider temperature range by increasing the current output from the current sources by a feedback arrangement as the variable resistance increases.

5 Claims, 8 Drawing Figures

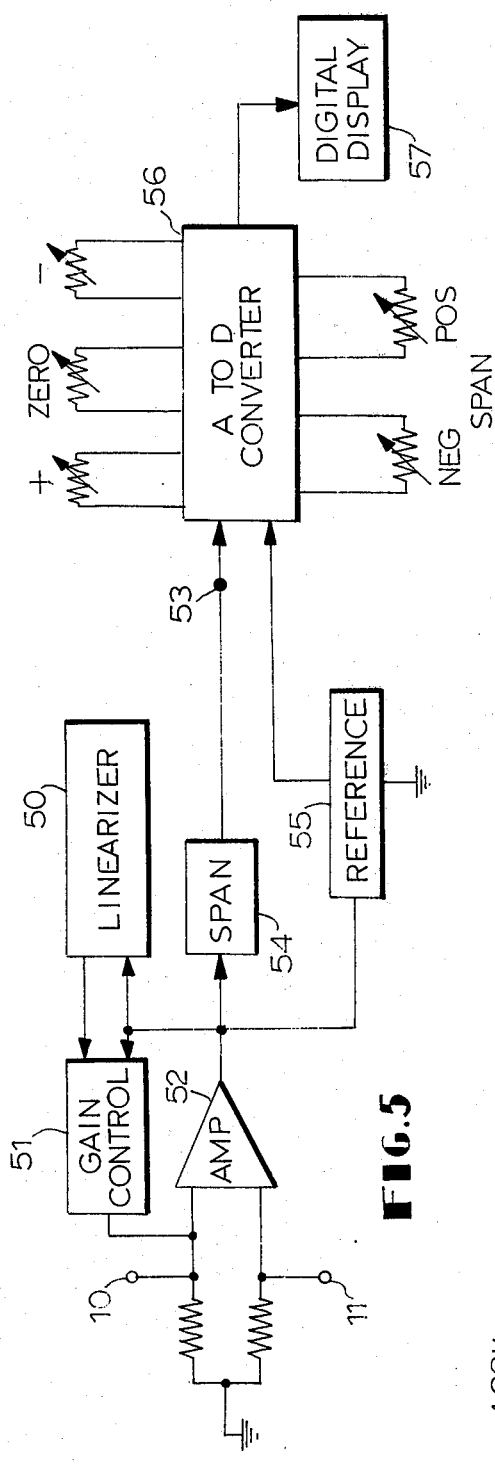
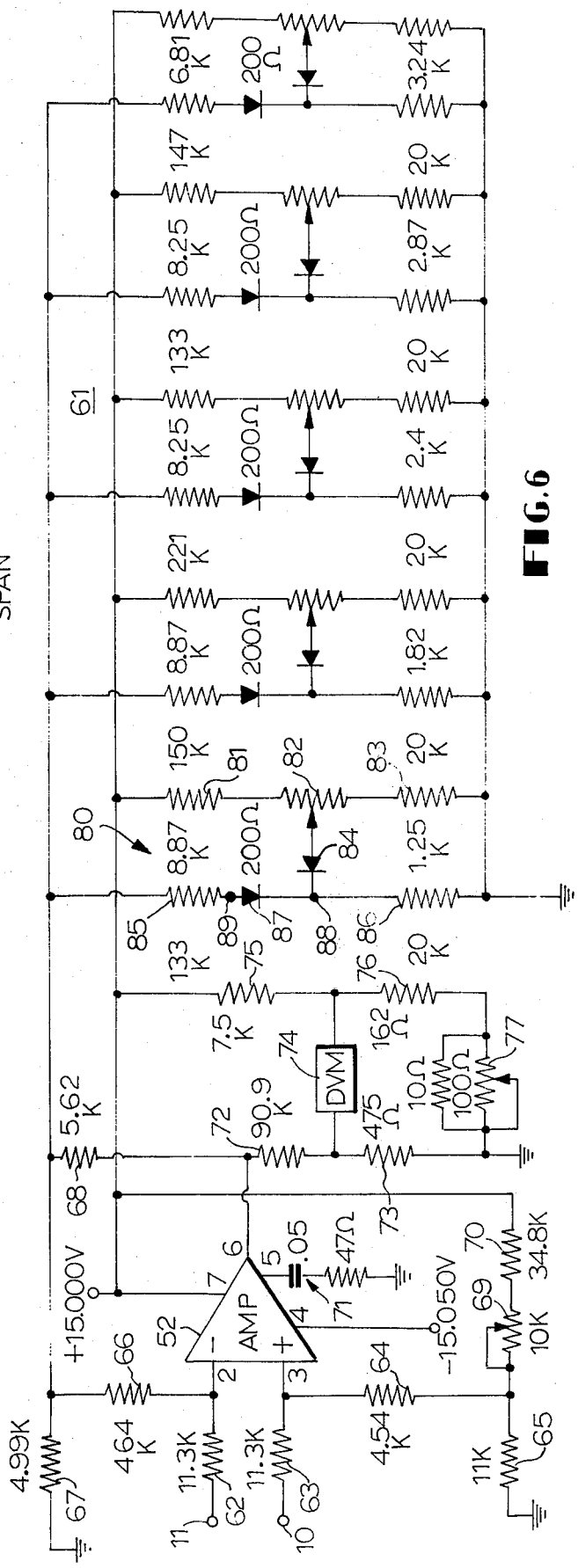

ELECTRONIC TEMPERATURE MEASURING APPARATUS

BACKGROUND OF THE INVENTION

This invention relates to electronic temperature indicators and more specifically it relates to electronic conversion of a temperature variable resistance value to a readout of a corresponding temperature in degrees Fahreheit or Centigrade.

It has been conventional to use bridge circuits to provide resistance readings of for example a temperature variable resistance. However, when a temperature reading is required a bridge arrangement is limited in speed, accuracy and range since it becomes non-linear when it becomes unbalanced and moves away from a null point, and/or is dependent upon a large number of expensive calibrated resistors that must be selected for comparison of different resistance values near a null condition. Also it is difficult to provide with bridge circuits direct readout in degrees because of non-linearities in the sensing resistors. Also, accuracy is difficult to attain and control because of lead resistances and drifting with temperature variations, etc.

OBJECTIVES OF THE INVENTION

Accordingly it is a general object of the invention to provide improved temperature sensing apparatus correcting deficiencies of the prior art such as those hereinbefore set forth.

A more specific object of the invention is to provide temperature sensing apparatus providing a fast readout in degrees over a large temperature span with high accuracy.

Other objects, features and advantages of the invention will be recognized throughout the description set forth hereinafter of preferred embodiments of the invention and its mode of operation.

BRIEF DESCRIPTION OF THE INVENTION

To achieve linearity over a wide span of measurements away from a null condition, two matched constant current sources are arranged to pass current through respectively a temperature variable sensor resistor and a reference resistor to a common junction point. This establishes a null voltage condition across the two series connected resistors at a predetermined starting point temperature calibration such as 0°F or 0°C. With this mode of operation temperature may be sensed accurately over a wide temperature span away from the null position by simply reading the voltage across the series connected resistors as the resistance of the sensor resistor increases with temperature. When a digital voltmeter is used a reading can be taken without parallex errors and a standard voltmeter can be in this mode of operation used to read out directly the temperature in 0°c or 0°F without calibration of the voltmeter scale.

The Drawings

Figure 3:
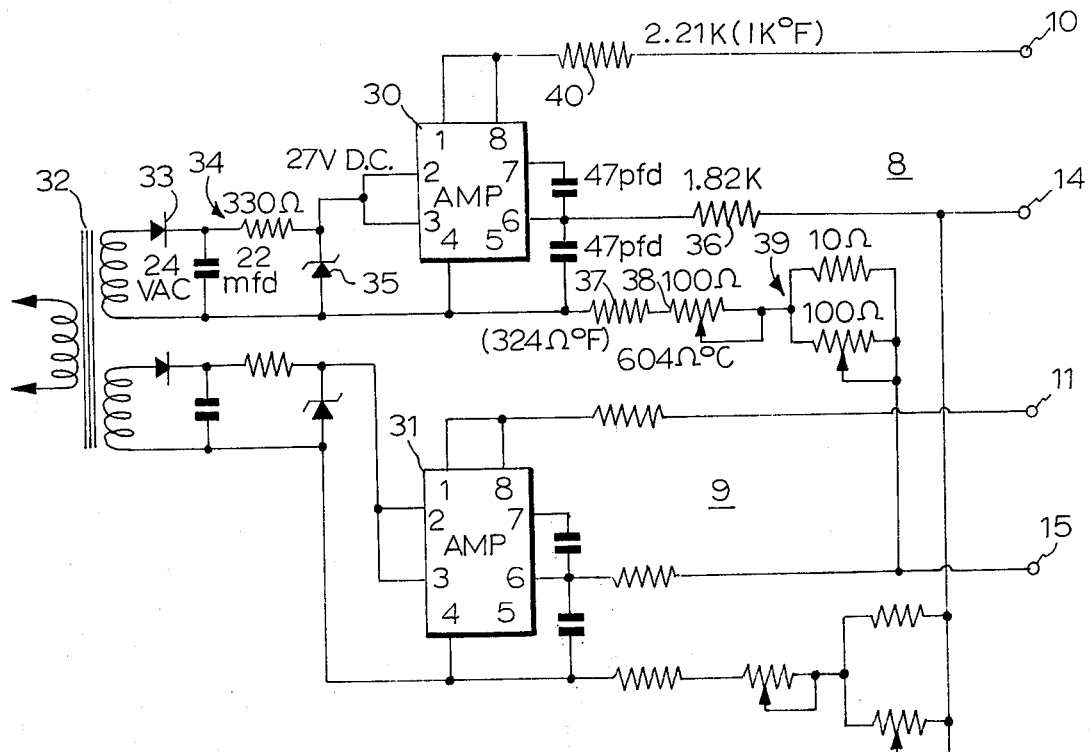
Figure 2:
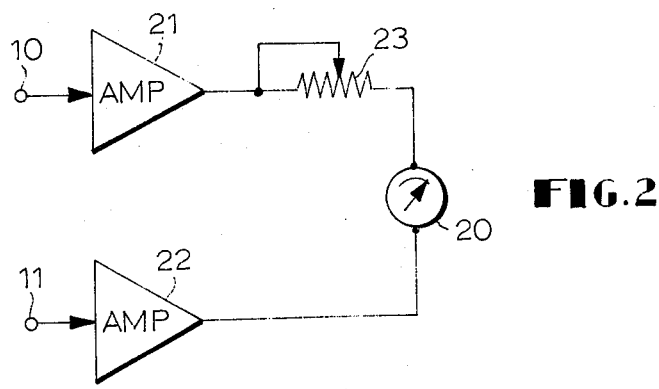
Figure 8:
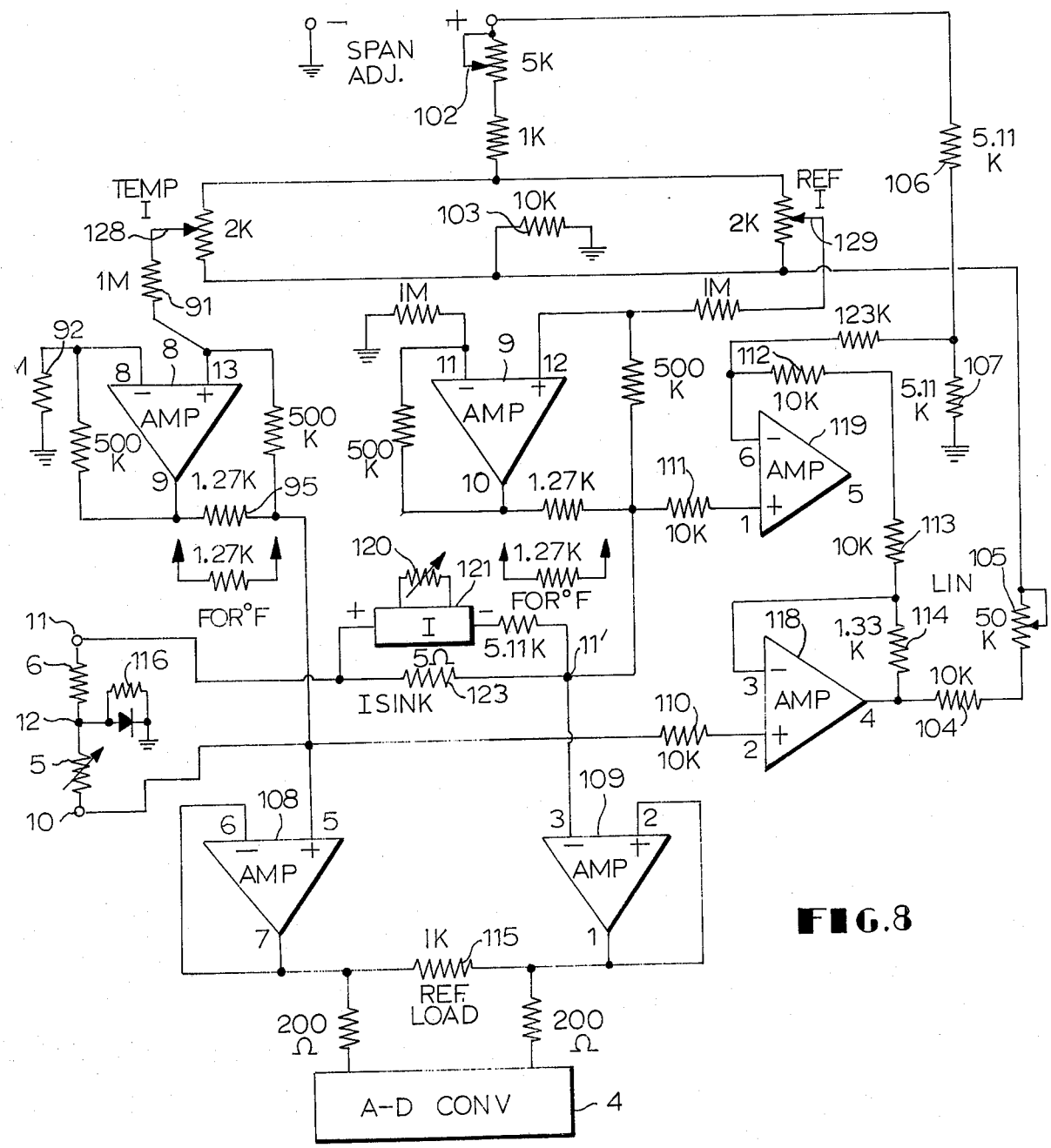
Figure 7:
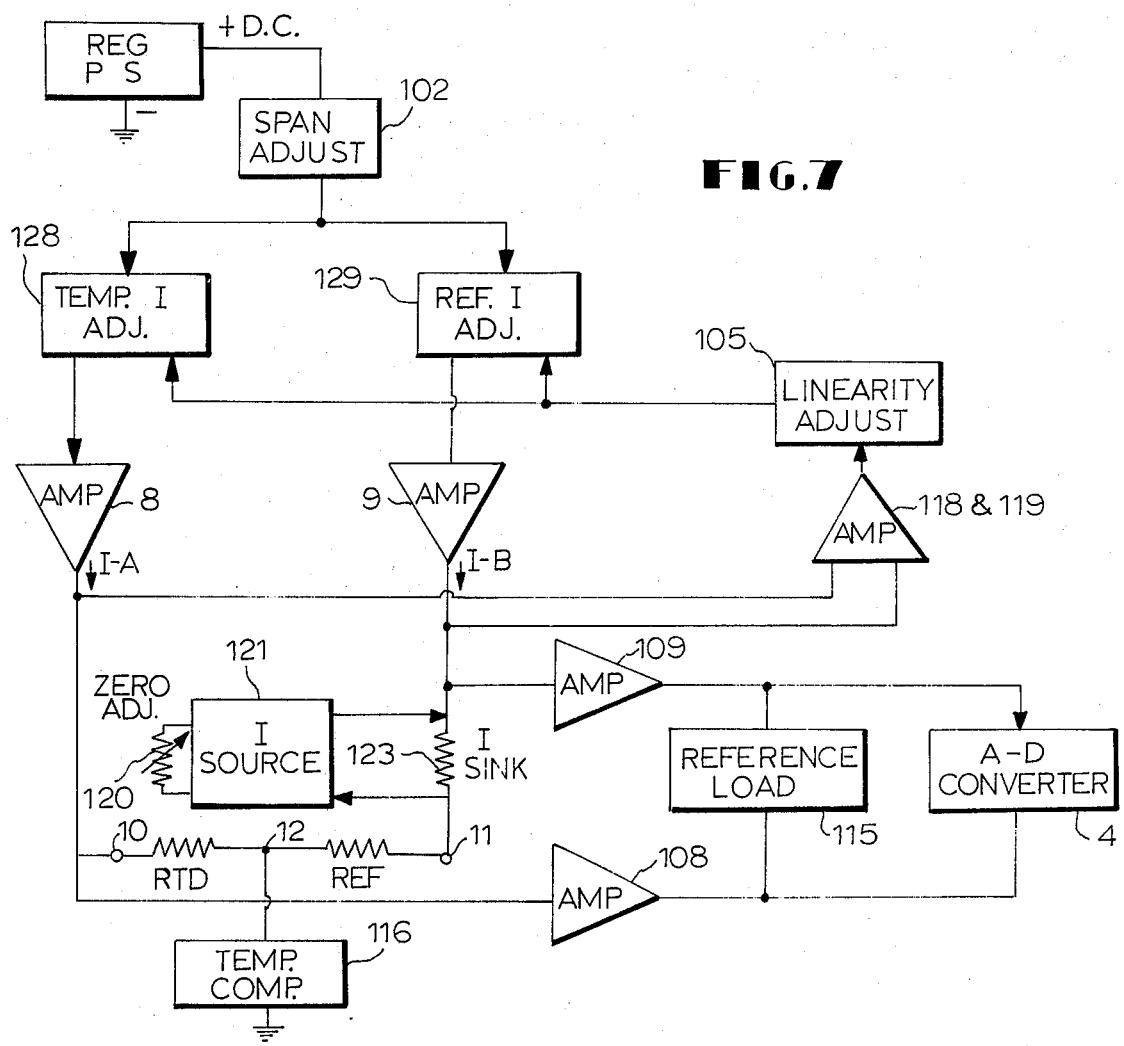
Figure 4:
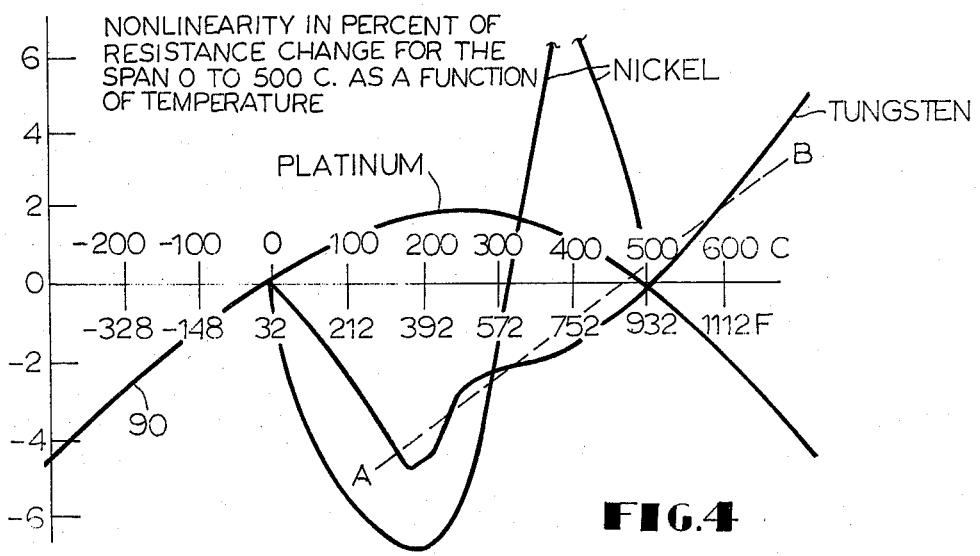

In the accompanying drawings are set forth preferred embodiments of the invention illustrating the nature of the invention and its mode of operation, as follows:

FIG. 1 is a schematic electric circuit diagram (partly in block form) of the basic temperature measurement technique afforded by this invention, FIG. 2 is a one line block diagram representation of an analog voltmeter temperature indicator afforded by the invention, FIG. 3 is a schematic diagram of matched constant current generators used in accordance with the teachings of this invention, FIG. 4 is a graph showing temperature resistance characteristics of several types of temperature sensing resistors, FIG. 5 is a block circuit diagram of a linearized digital voltmeter arrangement afforded by the invention to produce a digital readout directly in degree of temperature on a standard voltmeter scale in response to non-linear variations of resistance of a sensor resistor with temperature, FIG. 6 is a schematic circuit diargam of a preferred linearizing circuit embodiment afforded in the arrangement of FIG. 5, FIG. 7 is a block circuit diagram and FIG. 8 a corresponding schematic circuit diagram of a further embodiment of the invention which affords linearization of the current sources over a wide span of temperature measurements.

Throughout the various figures, similar reference characters are used for comparison of similar elements in the various views.

THE BASIC OPERATING MODE

As may be seen from FIG. 1, a meter display 4 will indicate temperature as a function of voltage across two series resistors, namely the temperature variable sensor resistor 5 and the precision reference resistor 6 (or 6A as determined by the position of switch 7). At a predetermined null calibration point, such as 0°C when 100 Ωresistor 6 is in circuit with the sensor resistor 5 of 100 Ωat 0°C, the currents from sources 8 and 9 will flow in the respective directions designated IA and IB to null out voltage on the meter 4. Then as the temperature varies, the sensor resistor 5 will present an increased resistance that will cause the meter 4 to read a voltage at the output terminals 10 and 11 which is a function of the temperature.

Constant current sources 8 and 9 are balanced and tracked to provide accuracy of measurement and may for example provide a current of 4.6 ma. For this value, the resistance of reference resistor 6A to produce a zero reading at 0°F would be 92.9 ohms. Preferably a 100 ohm platinum resistor sensor is used and a 100 mv digital voltmeter is used for measurement and display to avoid parallex reading errors. Thus, the temperature changes for each degree will produce a voltage change of one millivolt and the digital voltmeter can be made to track to read out temperature in degrees directly.

The output voltage therefore follows the temperature sensing resistor resistance linearly as the circuit moves away from null condition.

Resistances 16 and 17 represent lead or stray resistances and they may be equalized and balanced out so they do not affect the output readings or accuracies. Resistance 18 also represents a lead or stray resistance and this does not affect the meter reading. The potentiometer 19 is used to identically balance the currents IA and IB flowing from the respective current generators 8, 9 through the respective series circuits 10, 12, 14 and 11, 12, 15.

As may be seen in FIG. 2, the meter display 4 may be of the analog type with meter 20 indicating a temperature reading. In this case the matched buffer operational amplifiers 21, 22 with an output impedance of 20 ohms are used along with a span adjusting resistor 23 of about 100 ohms. The meter 20 is an 88 ohm one milliampere movement whose dial may be calibrated in terms of temperature degrees. The span adjust resistor 23 may be used to set full scale range on the meter 20 at a predetermined temperature setting such as 200°F after the current at terminals 10 and 11 is nulled for a temperature such as 0°F for a zero reading on meter 20.

THE CONSTANT CURRENT SOURCES

One preferred configuration of the matched constant current sources is shown in FIG. 3. Blocks 30 and 31 represent matched integrated circuit operational amplifiers of identical characteristics and the circuits provide identical current outputs as generators 8 and 9 at respective output terminal pairs 10–14 and 11–15.

The 24 volts AC from transformer 32 is rectified by diode 33 and filtered by capacitor-resistor network 34. Zener diode 35 provides a regulated d.c. voltage of 27 volts at the input terminals of amplifiers 30, 31. Resistors 36, 37, 38 and 39 constitute a biasing network for the operational amplifiers. The 47 pfd capacitors are RF suppressors. As may be seen the resistors 37 and 40 may be changed in value for operation in the Centigrade or Fahrenheit modes to produce the proper current value for tracking of the digital voltmeter scale.

LINEARIZATION FOR SENSOR TRACKING

As may be seen from FIG. 4, the sensor resistors may not have a resistance characteristic varying linearly with temperature. Thus, if better measurement accuracies are necessary, the non-linearity characteristics of the particular sensor element need be taken into consideration. It is evident that a preferred sensor characteristic is exhibited by the platinum sensor if an accuracy of no more than ± 1% is required in a 500° temperature range. This degree of accuracy may be accomplished without linearization for sensor characteristics.

A sensor linearizer arrangement such as that of FIG. 5 may be used to increase accuracies. Thus, the meter arrangement coupled to output terminals 10, 11 is made to track by means of a linearizer circuit 50, which in this preferred embodiment operates gain control circuit 51 to change the output of operational amplifier 52. A span control adjustment 54 is provided for the output of the amplifier.

The digital voltmeter is preferably of the type using a dual slope technique in analog to digital converter 56, which has a digital display panel 57. This type of digital voltmeter is commercially available, for example Weston Model 1292. The meter also should have available calibration adjustments shown by the variable resistors to permit setting of positive and negative span limits and for zero setting of positive and negative ranges as well as the basic meter zero setting.

A preferred linearization circuit embodiment is shown schematically in FIG. 6. Basically the linearization is accomplished in a matrix network 61 which controls feedback and therefore the gain of operational amplifier 52 at various temperature calibration points over a predetermined temperature range. Thus the nonlinearities of the sensor may be substantially eliminated from the output DVM readings to increase measurement accuracy. The amplifier 52 is a low drift, low noise operational amplifier that provides stable operation.

The gain control network for amplifier 52 includes resistors 62 to 68 and the matrix network 61. Resistors 69 and 70 comprise a balancing network for the operational amplifier and R-C filter 71 provides frequency compensation. The supply voltages are regulated and adjusted to +15.000 volts and −15.050 volts. Resistors 72 and 73 comprise a voltage divider network for the output of the amplifier into the digital voltmeter 74. Resistors 75 to 78 make up a span control network for the negative feed into the digital voltmeter 74.

Since the various segments 80, etc. of the matrix network operate in the same manner, only the initial segment is described. Thus, resistors 81, 82 and 83 set the bias point at which the segment is energized. Each of the segments is set to be energized at a different level, and the resistance values expected for corresponding temperature readings are accordingly corrected in the respective segments. The low leakage diode 84 serves as an active device which connects with the current leg comprising resistors 85, 86 and diode 87.

In operation a positive potential is present at junction point 88 which is adjusted within a narrow range by resistor 82. Whenever the potential at point 89 goes +.7 volts more positive than that at point 88, diode 87 conducts through resistors 85 and 86. This additional current path shunts resistor 67 and reduces the gain of operational amplifier 52. Thus the gain can be reduced at each of the segments 80 at different input voltages at terminals 10 and 11 to thereby cause the voltage presented to digital voltmeter 74 to be linearized compensating for the variations of the sensor resistor in use. Thus compensation on curve 90 of FIG. 4 for the temperature range 0° to 200°C may be effected, for example.

To calibrate the linearizer arrangement, a precision resistance value equal to sensor resistance at the desired temperature reading (199.9 for example) may be substituted for sensor resistor 5 in FIG. 1. The resistor 77 of FIG. 6 is adjusted for full scale reading on the digital voltmeter 74 after resistor 69 is set for proper operating output potential from amplifier 52. Then using a calibration curve such as 90 in FIG. 4 and choosing the substitute resistance values for the sensor resistor at five separate points within the temperature range each segment (80) is adjusted in turn by means of resistor 82 to correct deviations from linearity.

LINEARIZATION OF CONSTANT CURRENT SOURCES

To further improve temperature measurement accuracies with the method set forth in FIG. 1, the constant current sources may be linearized in the manner set forth in the embodiments of FIGS. 7 and 8. In this case each current source 8, 9 comprises an operational amplifier which is linearized to provide a current proportional to the input voltage.

The basic current source for the bi-lateral current linearization arrangement is shown in FIG. 8 as set forth for amplifier 8. The output current derived from the input voltage will be determined by the load resistance (which includes sensor resistor 5) and the gain setting of the operational amplifier established in part by the ratio of resistances 93 and 91. Resistor 95 is a reference resistor selectable to establish operating characteristics for either °C or °F (when reduced in ohmage by connecting in shunt the auxiliary resistor). The two current sources 8 and 9 are matched for tracking and temperature response, and also the resistance networks for the two sources. Each current source 8, 9 has a corresponding fine current adjustment 128, 129 and a common course span adjustment 102.

The arrangement operates in general to increase linearity by feedback at resistor 103 where an increase in potential increases the output current from both sources 8 and 9. The difference is taken across sensor and reference resistors 5 and 6 and is amplified by amplifiers 118 and 119 at a gain of about 13 to be fed back through resistors 104, 105 and 103. The amount of feedback is controlled by linearity adjustment resistor 105. This results in an increase in current as the temperature and resistance of the sensor resistor 5 rises which tends to linearize the output to buffer amplifiers 108 and 109.

Resistors 106 and 107 set up the bias starting point of the linearity feedback amplifiers 118 and 119. A gain circuit for the feedback amplifiers is composed of resistors 110 to 114. The buffer amplifiers 108 and 109 constitute low impedance current limiting buffers for the linearizer circuit which work into a reference load resistor 115 from which the digital voltmeter 4 derives a temperature reading. A temperature compensating resistor-diode circuit 116 is placed in the ground return lead from network terminal 12.

The linearizing arrangement is zero set by means of varying current flow by an adjustment 120 to a regulated current source 121. The current flow path is isolated to flow only through the sink resistor 123 to produce a balancing potential that is used to zero the circuit. After being zero set at resistor 120 and balanced at resistors 128 and 129 the linearity control 105 may be set for the proper amount of feedback to assure linearity of temperature readings over the resistance range of sensor resistor 5.

INTEGRATED CIRCUIT MODULES

Typical commercially available integrated circuits which may be used for the operational amplifiers hereinbefore shown in block diagram are listed and identified in the following table by reference characters shown in the accompanying drawing:

8 and 9 (FIG. 8) Matched pair operational amplifiers .. LM3900N 21 and 22 Matched pair operational amplifiers .. LM748CN 30 and 31 Matched pair operational amplifiers .. LM305

52 (FIG. 6) Operational amplifier .. M725B 108 and 109 (FIG. 8) Matched pair operational amplifiers .. LM748CN 118 and 119 (FIG. 8) Operational amplifiers .. LM3900N It is evident from the foregoing teachings and embodiments therefore that the present invention provides improved temperature sensing equipment that produces accurate measurements over a wide range of operating conditions. Having hereinbefore set forth the nature of the invention, its construction, and its mode of operation in preferred embodiments which illustrate features, operating conditions, and objectives of the invention, the appended claims set forth with particularity those novel features believed descriptive of the spirit and scope of the invention.

What is claimed is:

1. Apparatus for producing a direct readout of temperature in degrees on a linear scale of a voltmeter from the change of resistance of a single temperature variable resistor comprising in combination, a temperature responsive circuit coupled between a pair of temperature measurement output terminals to develop a voltage thereat changing in a substantially linear relationship corresponding in degrees of temperature to said linear scale said circuit including said temperature variable resistor and a reference resistor of fixed resistance, both being conductively connected together at a common intermediate access terminal, said pair of temperature measurement output terminals conductively connected to the respective opposite ends of said two resistors, means developing a voltage at said terminals varying in response to temperature as a function of resistance change in said temperature variable resistor consisting of a pair of current sources each having a like pole conductively coupled respectively to said two output terminals to pass current through the respective two said resistors to said intermediate terminal to establish at a null temperature setting of 0° a cancellation of voltage drops across said two resistors as measured at said pair of output terminals, a voltmeter circuit incorporating said linear scale and responding to the voltage produced at said pair of output terminals thereby registering by changes of voltage an indication on said scale of the degrees of temperature at said variable resistor, and a potentiometer connecting each said current source together with the variable arm conductively coupled to said common intermediate access terminal for balancing current flows from the respective current sources at 0° to produce a null reading on said voltmeter scale.

2. Apparatus as defined in claim 1, wherein said temperature variable resistor has a nonlinear relationship of resistance change over a predetermined temperature range, and including in said voltmeter circuit a linearization network providing a voltmeter scale output directly in degrees of temperature.

3. Apparatus as defined in claim 2, wherein said temperature variable resistor is of platinum.

4. Apparatus as defined in claim 1, wherein each current source comprises an operational amplifier which has positive feedback to produce a gain proportional to the output current.

5. Apparatus for producing a readout of temperature from the change of resistance of a single temperature variable resistor comprising in combination, a circuit coupled between a pair of temperature measurement output terminals including said temperature variable resistor and a reference resistor of fixed resistance both being connected together at a common intermediate access terminal and a pair of temperature measurement output terminals connected to the respective opposite ends of said two resistors, means developing a voltage at said terminals varying in response to temperature consisting of a pair of current sources each having a like pole coupled respectively to said two output terminals to pass current through the respective said resistors to said intermediate terminal to establish at a null temperature setting such as 0°C a cancellation of voltage drops across said two resistors as measured at said pair of output terminals, and a voltmeter connected to said pair of output terminals thereby registering by changes of voltage an indication of the temperature at said variable resistor, including a voltmeter zero set circuit coupled between said voltmeter and one of said terminals comprising a sink resistor, a two pole variably adjustable current source, and a circuit connecting said two poles of said current source to opposite ends of said sink resistor thereby to pass current only through said sink resistor.

* * * * *